US011205383B2

(12) United States Patent
Wang et al.

(10) Patent No.: US 11,205,383 B2
(45) Date of Patent: Dec. 21, 2021

(54) SCAN SIGNAL ADJUSTING METHOD, DEVICE AND DISPLAY PANEL

(71) Applicant: BOE TECHNOLOGY GROUP CO., LTD., Beijing (CN)

(72) Inventors: Ming Wang, Beijing (CN); Wenchao Bao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 419 days.

(21) Appl. No.: 16/343,760

(22) PCT Filed: Nov. 15, 2018

(86) PCT No.: PCT/CN2018/115624
§ 371 (c)(1),
(2) Date: Apr. 20, 2019

(87) PCT Pub. No.: WO2019/184390
PCT Pub. Date: Mar. 10, 2019

(65) Prior Publication Data

US 2021/0335250 A1 Oct. 28, 2021

(30) Foreign Application Priority Data

Mar. 30, 2018 (CN) ........................ 201810276328.4

(51) Int. Cl.
*G09G 3/3225* (2016.01)
*G09G 3/3233* (2016.01)
(Continued)

(52) U.S. Cl.
CPC ......... *G09G 3/3258* (2013.01); *G09G 3/3266* (2013.01); *G09G 3/3225* (2013.01); *G09G 3/3233* (2013.01); *G09G 2320/043* (2013.01)

(58) Field of Classification Search
CPC .. G09G 3/3225; G09G 3/3233; G09G 3/3258; G09G 3/3266; G09G 2300/043;
(Continued)

(56) References Cited

U.S. PATENT DOCUMENTS 7,317,400 B2 * 1/2008 Sato ...................... G09G 3/006
324/500
8,786,526 B2 7/2014 Noguchi
(Continued)

FOREIGN PATENT DOCUMENTS

CN 105761673 7/2016
CN 106782333 5/2017
(Continued)

OTHER PUBLICATIONS

1st Office Action dated Dec. 4, 2019 for Chinese Patent Application 201810276328.4.
(Continued)

*Primary Examiner* — Michael J Eurice
(74) *Attorney, Agent, or Firm* — Thomas | Horstemeyer, LLP

(57) ABSTRACT

The present disclosure relates to a technical field of display, and provides a scan signal adjusting method, a scan signal adjusting device, and a display panel. The scan signal adjusting method is used to adjust a scan signal of a control end of a switching transistor in a pixel driving circuit. The method includes obtaining a threshold voltage of the switching transistor and adjusting a voltage of the scan signal during a turn-off period according to the threshold voltage of the switching transistor.

20 Claims, 4 Drawing Sheets

(51) Int. Cl.
*G09G 3/3258* (2016.01)
*G09G 3/3266* (2016.01)

(58) Field of Classification Search
CPC ... G09G 2300/0819; G09G 2300/0842; G09G 2300/0852; G09G 2320/0233; G09G 2320/0295; G09G 2320/043; G09G 2320/045
See application file for complete search history.

(56) References Cited

U.S. PATENT DOCUMENTS

| | | | | |
|---|---|---|---|---|
| 2008/0238953 | A1* | 10/2008 | Ogura | G09G 3/3275 345/697 |
| 2009/0135111 | A1* | 5/2009 | Yamamoto | H01L 27/3272 345/76 |
| 2012/0127220 | A1 | 5/2012 | Noguchi | |
| 2013/0050292 | A1* | 2/2013 | Mizukoshi | G09G 3/3291 345/690 |
| 2013/0169699 | A1* | 7/2013 | Jeong | G09G 3/3225 345/690 |
| 2014/0354285 | A1* | 12/2014 | Kim | G09G 3/3233 324/414 |
| 2015/0123953 | A1* | 5/2015 | Shim | G09G 3/3233 345/205 |
| 2015/0294626 | A1* | 10/2015 | Bi | G09G 3/3233 345/211 |
| 2016/0012799 | A1* | 1/2016 | Kim | G09G 3/3208 345/205 |
| 2016/0062548 | A1* | 3/2016 | Kwon | G06F 3/042 345/173 |
| 2016/0189612 | A1* | 6/2016 | Lee | G09G 3/2003 345/690 |
| 2016/0343278 | A1* | 11/2016 | Tsujita | G09G 3/3233 |
| 2016/0351095 | A1* | 12/2016 | Tani | G09G 3/3283 |
| 2017/0110052 | A1* | 4/2017 | Kuo | G09G 3/30 |
| 2018/0061292 | A1* | 3/2018 | Hong | G09G 3/006 |
| 2018/0182278 | A1* | 6/2018 | Kim | G09G 3/3233 |
| 2021/0035502 | A1* | 2/2021 | Lee | G09G 3/3291 |
| 2021/0201810 | A1* | 7/2021 | Feng | G09G 3/3233 |

FOREIGN PATENT DOCUMENTS

| | | |
|---|---|---|
| CN | 107424560 | 12/2017 |
| CN | 107492343 | 12/2017 |
| CN | 107507565 | 12/2017 |
| CN | 107622754 | 1/2018 |
| CN | 107767813 | 3/2018 |
| CN | 107767814 | 3/2018 |
| CN | 107799061 | 3/2018 |
| CN | 108281105 | 7/2018 |
| KR | 20170010223 | 1/2017 |

OTHER PUBLICATIONS

2nd Office Action dated Apr. 30, 2020 for Chinese Patent Application 201810276328.4.

International Search Report and Written Opinion for PCT Patent Application PCT/CN2018/115624 dated Jan. 30, 2019.

* cited by examiner

SCAN SIGNAL ADJUSTING METHOD, DEVICE AND DISPLAY PANEL

CROSS REFERENCE TO RELATED APPLICATIONS

The present disclosure is a § 371 national phase filing of PCT/CN2018/115624, filed Nov. 15, 2018, which claims the benefit of and priority to Chinese Patent Application No. 201810276328.4, filed on Mar. 30, 2018, and entitled "Scan Signal Adjusting Method, Device and Display Device", the contents of which being incorporated by reference in their entirety herein.

TECHNICAL FIELD

The present disclosure relates to a technical field of display technology, and particularly, relates to a scan signal adjusting method, device, and a display panel.

BACKGROUND

In the display driving technology, an active matrix is formed by intersecting a scan line and a data line. Among the foregoing, the scan line is configured to provide a scan signal to a switching transistor in a pixel driving circuit, to control a turn-on and a turn-off of the switching transistor. The data line is configured to provide a data signal to the pixel driving circuit through the switching transistor.

In the related art, the scan signal includes a turn-on period and a turn-off period which are alternately arranged in time sequence. The scan signal controls the switching transistor to turn on, and the pixel driving circuit is in a charging stage when the scan signal is in the turn-on period. The scan signal controls the switching transistor to turn off and the pixel driving circuit is in a non-charging stage when the scan signal is in the turn-off period.

However, in the related art, since the switching transistor is in a negative bias voltage state for a long period (only in a positive bias voltage when the pixel driving circuit is the charging stage), due to the pixel driving circuit needing to be in the non-charging state for a long period, a negatively offset may occur in a threshold voltage of the switching transistor. The scan signal will not be able to turn off the switching transistor during a turn-off period when the threshold of the switching transistor is offset to a certain value, which causes the pixel driving circuit to display abnormally.

It should be noted that the information disclosed in the above background only serves to enhance an understanding of the background of the present disclosure, which may include information that does not constitute prior art known to those skilled in the art.

BRIEF SUMMARY OF INVENTION

According to one aspect of the present disclosure, a scan signal adjusting device is provided, and the adjusting device is configured to adjust a scan signal of a control end of a switching transistor in a pixel driving circuit. The scan signal adjusting device includes a detection circuit and a control circuit. The detection circuit is configured to obtain a threshold voltage of the switching transistor. The control circuit is configured to adjust a voltage of the scan signal during a turn-off period according to the threshold voltage of the switching transistor.

In an example embodiment of the present disclosure, the pixel driving circuit is arranged in a display area of a display panel. The detection circuit includes a detector, a detection line, and a detection transistor. The detection line is coupled with the detector, and the detector is configured to detect a voltage and a current of the detection line. A first end of the detection transistor is coupled with a first end of the switching transistor of the pixel driving circuit in the display area, a second end of the detection transistor is coupled with the detection line, and a control end of the detection transistor is configured to receive a control signal to control an on-off state of the first end and the second end of the detection transistor.

In an example embodiment of the present disclosure, the detection circuit further includes a detection capacitor. A first electrode of the detection capacitor is coupled with the detection line and a second electrode of the detection capacitor is grounded.

In an example embodiment of the present disclosure, the pixel driving circuit is arranged in a display area and a non-display area of a display panel, and the pixel driving circuit further includes a driving transistor. A transistor characteristic of the driving transistor of the pixel driving circuit in the non-display area is the same as a transistor characteristic of the switching transistor of the pixel driving circuit in the display area.

In an example embodiment of the present disclosure, the detection circuit includes a detection line, a detector, and a detection capacitor. The detector is coupled with the detection line, and is configured to detect a voltage and a current of the detection line. A first end of the detection transistor is coupled with a second end of the driving transistor of the pixel driving circuit in the non-display area, a second end of the detection transistor is coupled with the detection line, and a control end of the detection transistor is configured to receive a control signal to control an on-off state of the first end and the second end of the detection transistor. A first electrode of the detection capacitor is coupled with the detection line, and a second electrode of the detection capacitor is grounded.

In an example embodiment of the present disclosure, the control circuit includes a chip on a display panel or a variable resistor on a circuit board of the display panel.

In an example embodiment of the present disclosure, the pixel driving circuit includes a switching transistor, a driving transistor, an electroluminescent element, and a charging capacitor. A second end of the switching transistor is coupled with a data line to receive a data signal, and a control end of the switching transistor is coupled with the scan signal to control an on-off state of a first end and the second end of the switching transistor. A control end of the driving transistor is coupled with the first end of the switching transistor, and a first end of the driving transistor is coupled with a first power signal terminal. An input end of the electroluminescent element is coupled with a second end of the driving transistor, and an output end of the electroluminescent element is coupled with a second power signal terminal. A first electrode of the charging capacitor is coupled with the first end of the switching transistor, and a second electrode of the charging capacitor is coupled with the input end of the electroluminescent element.

According to one aspect of the present disclosure, a display panel is provided, and the display panel includes the above-described scan signal adjusting device and pixel driving circuit.

According to one aspect of the present disclosure, a scan signal adjusting method is provided for adjusting a scan signal of a control end of a switching transistor in a pixel driving circuit. The scan signal adjusting method includes obtaining a threshold voltage of the switching transistor and adjusting a voltage of the scan signal during a turn-off period according to the threshold voltage of the switching transistor.

In an example embodiment of the present disclosure, the obtaining a threshold voltage of the switching transistor includes: applying a control voltage to a control end of the switching transistor to turn on the switching transistor; inputting a constant voltage to a second end of the switching transistor such that an current being output from a first end of the switching transistor; detecting a critical voltage of the first end of the switching transistor when the current output from the switching transistor changes from non-zero to zero or changes from non-zero to zero; and obtaining the threshold voltage of the driving transistor according to the control voltage and the critical voltage.

In an example embodiment of the present disclosure, an initial voltage of the first end of the switching transistor is set to zero while applying the control voltage to the control end of the switching transistor.

In an example embodiment of the present disclosure, the obtaining a threshold voltage of the switching transistor is completed in a charging phase of the pixel driving circuit.

In an example embodiment of the present disclosure, the adjusting a voltage of the scan signal during a turn-off period according to the threshold voltage of the switching transistor includes adjusting the voltage of the scan signal during the turn-off period when an absolute value of a difference between the threshold voltage of the switching transistor and the voltage of the scan signal during the turn-off period is less than a preset value.

In an example embodiment of the present disclosure, the adjusting a voltage of the scan signal during a turn-off period includes:

adjusting the voltage of the scan signal during the turn-off period in a black frame insertion period of the pixel driving circuit according to the threshold voltage of the switching transistor and a type of the switching transistor, where the pixel driving circuit is in a non-charging period when the scan signal is in the turn-off period and the non-charging period of the pixel driving circuit includes the black frame insertion period of the pixel driving circuit.

In an example embodiment of the present disclosure, the adjusting a voltage of the scan signal during a turn-off period in a black frame insertion stage of the pixel driving circuit according to the threshold voltage of the switching transistor, and a type of the switching transistor includes: controlling the voltage of the scan signal during the turn-off period to a first preset voltage so that the difference between the threshold voltage of the switching transistor and the first preset voltage is larger than the preset value when the switching transistor is an N-type transistor.

In an example embodiment of the present disclosure, the adjusting a voltage of the scan signal during a turn-off period in a black frame insertion stage of the pixel driving circuit according to the threshold voltage of the switching transistor and a type of the switching transistor includes controlling the voltage of the scan signal during the turn-off period to a second preset voltage so that an absolute value of the difference between the threshold voltage of the switching transistor and the second preset voltage is larger than the preset value when the switching transistor is a P-type transistor.

In an example embodiment of the present disclosure, the adjusting method further includes not adjusting the voltage of the scan signal during a turn-off period any more when an absolute value of the voltage of the scan signal during the turn-off period is larger than the set value.

The present disclosure provides a scan signal adjusting method, a scan signal adjusting device, and a display panel. The scan signal adjusting method provided by certain embodiments of the present disclosure includes adjusting a voltage of the scan signal during a turn-off period according to a threshold voltage of a switching transistor. In one aspect, the scan signal adjusting method can solve the problem of poor display effects of a pixel driving circuit caused by cases that the switching transistor cannot be turned off. In another aspect, by way of the scan signal adjusting method, the threshold of the switching transistor can be detected in real time and the voltage of the scan signal can be adjusted during the turn-off period to avoid the problem that offset velocity of the threshold of the switching transistor is accelerated due to directly setting a lower or higher voltage during the turn-off period, and a service life of the switching transistor can thereby be ensured.

It should be understood that the above general description and the following detailed description are only exemplary and explanatory, and should not limit the present disclosure.

BRIEF DESCRIPTION OF THE DRAWINGS

Accompanying drawings herein are incorporated into the specification and are formed a part of the present specification. The accompanying drawings show embodiments conforming to the present disclosure, and are used to explain the principles of the present disclosure together with the specification. Understandably, the accompanying drawings described below are only some embodiments of the present disclosure, and other accompanying drawings can also be obtained according to these accompanying drawings without any creative work for those skilled in the art.

DETAILED DESCRIPTION

Figure 1:
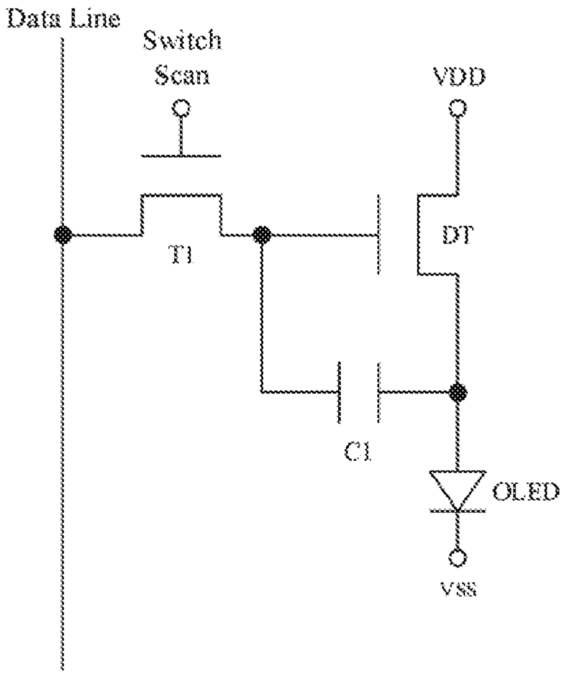
FIG. 1 is a structure schematic diagram of a pixel driving circuit in a related art.

Now, example embodiments will be described more comprehensively with reference to the accompanying drawings. However, the example embodiments can be implemented in various manners, and should not be understood as being limited to the example embodiments set forth herein. On the contrary, these embodiments are provided to make the present disclosure be more comprehensive and complete, and various concepts of the example embodiments will be comprehensively communicated to those skilled in the art. The same reference numerals in the accompanying figures denote the same or similar components thereby detailed description thereof will be omitted.

Although relative terms such as "upper" and "lower" in the present specification are used to describe a relative relationship between one component and another component of the reference numerals, these terms used in the present specification are only for convenience, such as according to a direction of the example described in the accompanying figures. It should be understood that if a device of a reference numeral is flipped to make the device upside down, the component described in the "upper" will become the component described in the "lower". The other relative terms, such as "high", "low", "top", "bottom", "left", "right" and etc. also have the similar meanings. When a component is "upper" on the other component, it may refer to the component being formed on the other component, refer to the component being "directly" arranged on the other component, or refer to the component being "indirectly" arranged on the other component by another component.

Terms "one", "a/an", or "the" are used to denote the existence of one or more elements/components/etc. Terms "including" and "having" are used to denote the meaning of inclusive inclusion and refer to that there may be other element/component/etc. in addition to a listed element/component/etc.

A structure schematic diagram of a pixel driving circuit in a related art is shown in FIG. 1. The pixel driving circuit includes a switching transistor T1, a driving transistor DT, a charging capacitor C1, and an electroluminescent element, such as an Organic Light-Emitting Diode (OLED) coupled to the driving transistor DT. A control end of the switching transistor T1 receives a scan signal Switch Scan, so as to control an on-off state of the switching transistor T1. A control end of the driving transistor DT receives a data signal transmitted via a data line Date Line through the switching transistor T1. A first end of the driving transistor DT is coupled with a first power signal terminal VDD, and a second end of the driving transistor DT is coupled with one end of the electroluminescent element OLED. Both ends of the charging capacitor C1 are coupled with the control end and the second end of the driving transistor DT, respectively. The other end of the electroluminescent element OLED is coupled with a second power signal terminal VSS.

Figure 2:
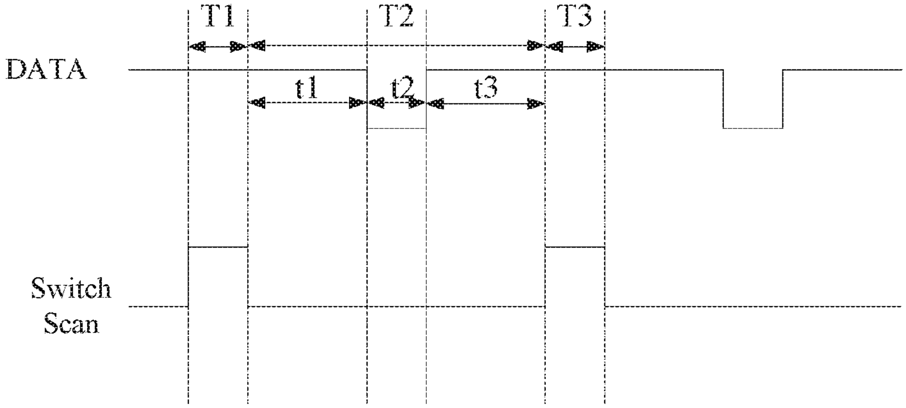
FIG. 2 is a sequence diagram of a pixel driving circuit in a related art.
Figure 3:
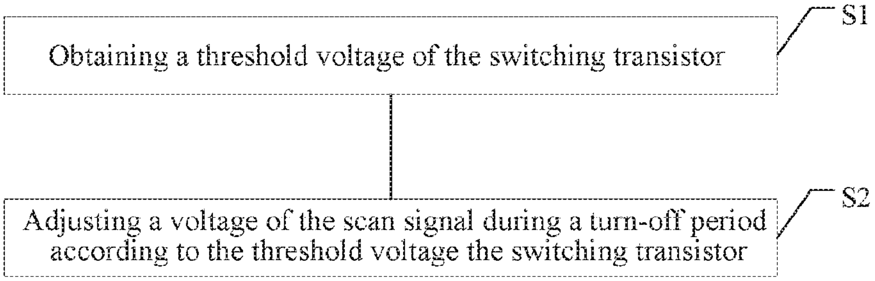
FIG. 3 is a flowchart of a scan signal adjusting method according to an example embodiment of the present disclosure.

A sequence diagram of the pixel driving circuit in the related art is shown in FIG. 2. In the figure, the switching transistor T1 is an N-channel type switching transistor. In the related art, the pixel driving circuit includes a charging stage (i.e., T1 time period) and a non-charging stage (i.e., T2 time period). The non-charging stage (i.e., T2 time period) includes a first light-emitting stage (i.e., T1 time period), a black frame insertion stage (i.e., T2 time period), and a second light-emitting stage (i.e., T3 time period). A display stage includes the first light-emitting stage and the second light-emitting stage, and the other periods belong to a non-display stage. The scan signal Switch Scan is in a turn-on period during the charging stage (the scan signal is a high potential signal). The data signal is also a high potential signal. The scan signal Switch Scan controls the switching transistor T to be turned on. A high potential signal is input to the control end of the driving transistor DT via the switching transistor T1 through data signal DATA, and charging the charging capacitor C1. The high potential signal is continuously input to the driving transistor DT by the charging capacitor C1 to turn on the driving transistor DT during the non-charging stage, and causes the electroluminescent element OLED emit light. However, the scan signal Switch Scan is in a turn-off period (the scan signal is a low potential signal) and the data signal DATA is a low potential signal during the black frame insertion stage. If a threshold voltage of the switching transistor T1 is offset at this time, the scan signal Switch Scan can't turn off the switching transistor T1. For example, the switching transistor T1 is a depletion-mode N-channel transistor, and an original threshold voltage of the switching transistor T1 is −5V, a turn-off voltage of the scan signal Switch Scan is −5.5V. When the threshold voltage of the switching transistor T1 offsets to −5.5V, the scan signal Switch Scan can't turn off the switching transistor T1. At this time, charges stored in the charging capacitor C1 will flow to the data line Data Line via the unclosed switching transistor T1, thereby resulting in the electroluminescent element OLED working abnormally. Based on the foregoing, a scan signal adjusting method is proposed by the present example embodiment. The scan signal adjusting method is used to adjust the scan signal of the control end of the switching transistor in the pixel driving circuit. A flowchart of the scan signal adjusting method for the example embodiment of the present disclosure is shown in FIG. 3. The method includes:

S1: obtaining the threshold voltage of the switching transistor; and

S2: adjusting a voltage of the scan signal during the turn-off period according to the threshold voltage of the switching transistor.

The present disclosure provides a scan signal adjusting method, a scan signal adjusting device, and a display panel. The scan signal adjusting method includes: adjusting the voltage of the scan signal during the turn-off period according to the threshold voltage of the switching transistor. In one aspect, the scan signal adjusting method can solve the problem of poor display of the pixel driving circuit caused by the inability to turn off the switching transistor. In another aspect, the scan signal adjusting method may detect the threshold of the switching transistor in real time and adjust the voltage of the scan signal during the turn-off period, so as to avoid the problem that an acceleration of a threshold offset speed of the switching transistor caused by directly setting lower or higher voltage during the turn-off period, which ensures a service life of the switching transistor.

The scan signal adjusting method of the present example embodiment will be described in detail below.

Figure 4:
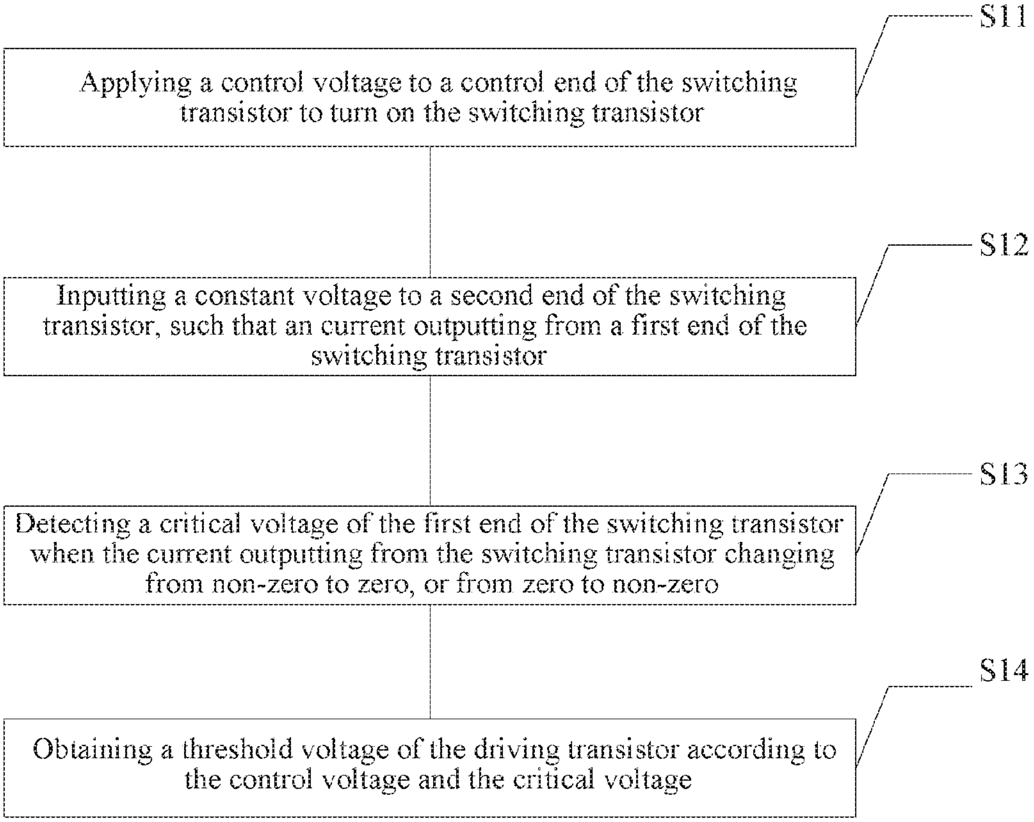
FIG. 4 is a flowchart of obtaining a threshold voltage of the switching transistor according to an example embodiment of the present disclosure.

The threshold voltage of the switching transistor is obtained in step S1. A flowchart of obtaining the threshold voltage of the switching transistor according to an example embodiment of the present disclosure is shown in FIG. 4. Obtaining the threshold voltage of the switching transistor may include:

Step S11: applying a control voltage to the control end of the switching transistor to turn on the switching transistor;

Step S12: applying a constant voltage to the second end of the switching transistor, such that a current being output form the first end of the switching transistor;

Step S13: detecting a critical voltage of the first end of the switching transistor when the current output from the switching transistor changes from non-zero to zero; and Step 14: obtaining the threshold voltage of the driving transistor according to the control voltage and the critical voltage.

According to a I-V characteristic of the switching transistor, when the switching transistor is turned on completely, the current output from the first end of the switching transistor is:

$$Iout=K\times(Vgs-Vth)^2=K\times(Vg-Vs-Vth)^2$$

In the above formula, K is the mobility of the switching transistor, Vg is the voltage of the control end of the switching transistor, Vs is the voltage of the second end of the switching transistor, and Vth is the threshold voltage of the switching transistor.

Thus, it can be seen that, in an embodiment of the present disclosure, a constant control voltage Vg is applied to the control end of the switching transistor during an entire process of detecting the threshold voltage of the switching transistor, such that the switching transistor is turned on during an entire detection process. In addition, a constant voltage Vs is applied to the second end of the switching transistor, such that a non-zero current is output from the first end of the switching transistor. When the voltage of the first end of the switching transistor gradually rises to Vd=Vg−Vth from zero, the switching transistor is turned off and the output current is zero. At this time, the voltage Vd of the first end of the switching transistor doesn't further change, and the voltage Vd=Vs is the critical voltage. That is to say, when the current output from the switching transistor changes from non-zero to zero, the voltage Vd of the first end of the switching transistor rises to Vg−Vth, and the critical voltage is Vsc=Vg−Vth. Therefore, the threshold voltage of the switching transistor Vth=Vg−Vsc may be obtained through measuring the critical voltage Vsc and the voltage Vg of the control end of the switching transistor. It should be understood that there are more implementations that can be chosen for obtaining the threshold voltage of the switching transistor, and all such implementations fall within the protection scope of the present disclosure.

In the present example embodiment, an initial voltage of the first end of the switching transistor can be set to zero while applying the control voltage to the control end of the switching transistor. The initial voltage of the first end of the switching transistor setting to zero is implemented to eliminate an influence of a residual voltage on detection results.

In the present example embodiment, it is necessary to gradually raise the voltage of the first end of the switching transistor to obtain the critical voltage Vsc when obtaining the threshold voltage of the switching transistor. Therefore, obtaining the threshold voltage of the switching transistor can be completed in the charging stage of the pixel driving circuit such that a influence of a change in the voltage of the first end of the switching transistor on the light-emitting stage of the pixel driving circuit can be avoided when obtaining the threshold voltage of the switching transistor. In addition, obtaining the threshold voltage of the switching transistor can also be completed in a blank stage between each frame of the pixel driving circuit.

In the step S2, a voltage of the scan signal during the turn-off period is adjusted according to the threshold voltage of the switching transistor.

In the present example embodiment, adjusting the voltage of the scan signal during the turn-off period according to the threshold voltage of the switching transistor may include adjusting the voltage of the scan signal during the turn-off period when an absolute value of a difference between the threshold voltage of the switching transistor and the voltage of the scan signal during turn-off period is less than a preset value. That is, the voltage of the scan signal during the turn-off period is adjusted before the switching transistor can't be turned off by the voltage the scan signal during the turn-off period.

In an embodiment of the present disclosure, the preset value may be adjusted and designed according to an actual product. For example, the preset value may be 0V, 0.5V, or 1.5V, etc., which is not limited in the present disclosure.

In the present example embodiment, adjusting a voltage of the scan signal during the turn-off period includes adjusting the voltage of the scan signal during the turn-off period in the black frame insertion period of the pixel driving circuit according to the threshold voltage of the switching transistor and a type of the switching transistor.

As shown in FIG. 2, the pixel driving circuit is in the non-charging period when the scan signal is in the turn-off period, and the non-charging period of the pixel driving circuit includes the black frame insertion period of the pixel driving circuit. The influence on the normal display caused by a regulation voltage can be avoided when adjusting the voltage of the scan signal during turn-off period in the black frame insertion period of the pixel driving circuit. In another embodiment, it should be understood that there are more selectable manners of adjusting the voltage of the scan signal during the turn-off period according to the threshold voltage of the switching transistor, which are all within the protection scope of the present disclosure.

In the present example embodiment, the switching transistor may be either an N-channel type transistor or a P-channel type transistor. A switching characteristic of the N-channel type transistors is that the N-channel type transistor is turned on when a voltage of a control end of the N-channel type transistor is larger than a threshold voltage of the N-channel type transistor. The N-channel type transistor is turned off when the voltage of the control end of the N-channel type transistor is less than the threshold voltage of the N-channel type transistor. Therefore, it is necessary to control the voltage of the scan signal to negatively jump to the preset voltage when the threshold voltage of the N-channel type transistor is negatively offset. A switching characteristic of the P-channel type transistors is that the P-channel type transistor is turned off when a voltage of a control end of the P-channel type transistor is larger than a threshold voltage of the P-channel type transistor. The P-channel type transistor is turned on when the voltage of the control end of the P-channel type transistor is less than the threshold voltage of the P-channel type transistor. Therefore, it is necessary to control the voltage of the scan signal to positively jump to the preset voltage when the threshold voltage of the P-channel type transistor is negatively offset.

In the present example embodiment, adjusting the voltage of the scan signal during the turn-off period in the black frame insertion stage of the pixel driving circuit according to the threshold voltage of the switching transistor and a type of the switching transistor includes controlling the voltage of the scan signal during the turn-off period to a first preset voltage, so that a difference between the threshold voltage of the switching transistor and the first preset voltage is larger than the preset value when the switching transistor is a N-type transistor.

In the present example embodiment, adjusting the voltage of the scan signal during the turn-off period in the black frame insertion stage of the pixel driving circuit according to the threshold voltage of the switching transistor and a type of the switching transistor includes controlling the voltage of the scan signal during the turn-off period to a second preset voltage so that an absolute value of a difference between the threshold voltage of the switching transistor and the second preset voltage is larger than the preset value when the switching transistor is a P-type transistor.

In the present embodiment, arrangements of the first preset voltage and the second preset voltage may be adjusted and designed according to the currently detected threshold voltage of the switching transistor, which is not limited in the present disclosure.

In the present example embodiment, the method may further include not adjusting the voltage of the scan signal during the turn-off period any more when an absolute value of the voltage of the scan signal during the turn-off period is larger than the set value.

Here, the switching transistor T1 is taken as an example of the N-channel type transistor to illustrate. It is supposed that the threshold voltage Vth of the switching transistor T1 offsets from an original −5V to −5.5V. If the voltage of the scan signal Switch Scan of the switch transistor during the turn-off period in the black frame insertion period is adjusted from an original −5.5V to −7V, charge leakage will not occur in the switching transistor T1 at this time. Therefore, the switching transistor T1 can operate normally without failure.

As the switching transistor T1 continues to operate with a negative bias voltage, the threshold voltage Vth of the switching transistor T1 may continue to offset negatively. For example, if the voltage of the scan signal Switch Scan during the turn-off period is not changed, the switching transistor will leak and cause a defect when the threshold voltage of the switching transistor T1 is detected to reach −7V. Therefore, if the voltage of the scan signal Switch Scan during the turn-off period is changed to −9V at this time, the leakage of the switching transistor T1 again disappears.

The switching transistor T1 continues to operate with the negative bias voltage, such that the threshold voltage of the switching transistor T1 offsets to −9V and negatively below. It is no longer suggested to adjust the voltage of the Switch Scan during the turn-off period, as too low of a voltage of the Switch Scan during the turn-off period can cause a problem of a low display brightness.

It should be noted that the above illustrated examples of −5V, −5.5V, −7V, −9V, etc. are empirical values of a specific application scenario. These values may be adjusted accordingly when a solution provided by the embodiment of the present disclosure is applied to different products. For example, the set value may be set to −7V or −11V in another embodiment, which is not limited in the present disclosure. And here, the N-channel type transistor is taken as an example to illustrate, so when applied to a P-channel type transistor, a corresponding positive value should be taken.

In the present example embodiment, the scan signal adjusting method can adjust the scan signal in real time. For example, the threshold voltage of the switching transistor can be obtained once per preset frame number of the pixel driving circuit, and the voltage of the scan signal can be adjusted during the turn-off period according to the threshold voltage of the switching transistor. In another embodiment, there are more selectable manners of adjusting the scan signal in real time. For example, the frame number between adjusting the scan signal once can also be different, which are all within the protection scope of the present disclosure.

Figure 5:
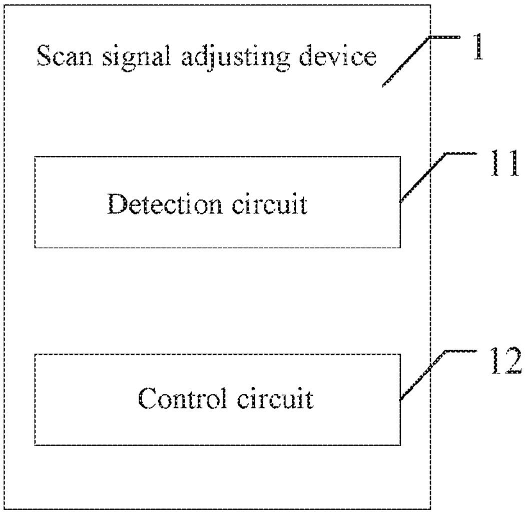
FIG. 5 is a structure schematic diagram of a scan signal adjusting device according to an example embodiment of the present disclosure.

A scan signal adjusting device is further provided in the present example embodiment. A structural schematic diagram of the scan signal adjusting device for the example embodiment of the present disclosure is shown in FIG. 5. The scan signal adjusting device 1 for adjusting the scan signal of the control end of the switching transistor in the pixel driving circuit includes a detection circuit 11 and a control circuit 12. The detection circuit 11 is configured to obtain the threshold voltage of the switching transistor. The control circuit 12 is configured to adjust the voltage of the scan signal during the turn-off period according to the threshold voltage of the switching transistor.

In the present example embodiment, the control circuit 12 can adjust the voltage of the scan signal during the turn-off period by an chip, i.e., integrated circuit (IC) on the display panel, and can also adjust the voltage of the scan signal during the turn-off period through a variable resistor on a circuit board of the display panel.

Figure 6:
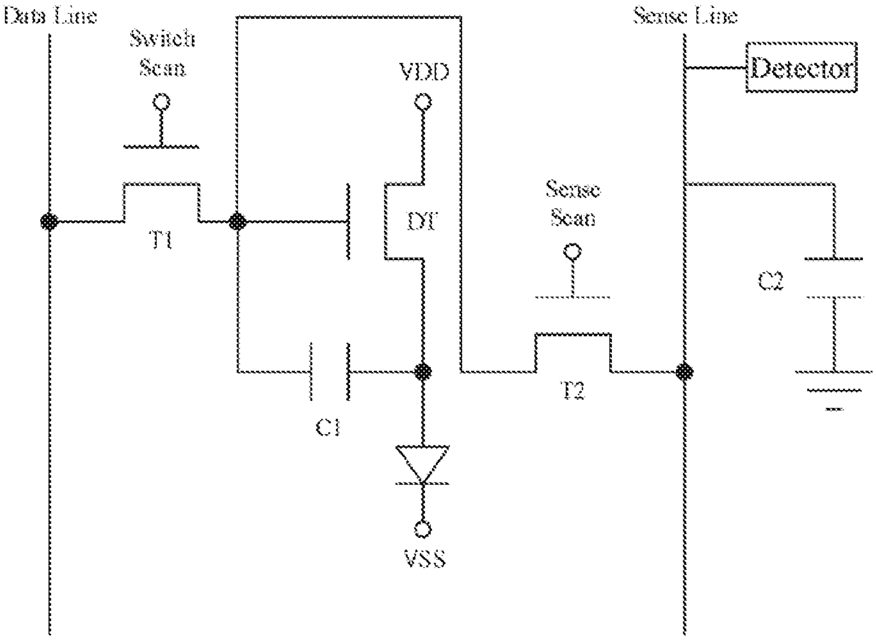
FIG. 6 is a circuit diagram of a detection circuit according to an example embodiment of the present disclosure.

In the present example embodiment, a circuit diagram of the detection circuit for the example embodiment of the present disclosure is shown in FIG. 6. The detection circuit may include a detector, a detection line Sense Line, a detection transistor T2 and a detection capacitor C2. The detection line Sense Line is coupled with the detector, where the detector may be configured to detect a voltage and a current of the detection line Sense Line. For example, the detector may be an Analog-to-Digital Converter (ADC) sampling circuit. The ADC sampling circuit is included in the chip of the display panel. A first end of the detection transistor T2 is coupled with the first end of the switching transistor T1. A second end of the detection transistor T2 is coupled with the detection line Sense Line. A control end of the detection transistor T2 is configured to receive a control signal Sense scan to control an on-off state of the first end and the second end of the detection transistor T2. A first electrode of the detection capacitor C2 is coupled with the detection line Sense Line, a second electrode of the detection capacitor C2 is grounded. In the present example embodiment, the detection circuit 11 can detect the threshold of the switching transistor T1 in the charging stage of the pixel driving circuit. In the charging stage of the pixel driving circuit, a high potential signal is input to the second end of the switching transistor T1 via the data line Date Line, the control end of the switching transistor T1 is turned on under a control of the scan signal Switch Scan. Here, the switching transistor T1 takes the N-type transistor as an example to illustrate, the control signal Sense Scan acts on the control end of the detection transistor T2 to turn on the detection transistor T2. The detection line Sense Line sets an initial voltage of the first end of the switching transistor T1 to zero through the detection transistor T2. A constant high potential signal Vs is input to the second end of the switching transistor T1 via data line Data Line, thereby a current is output from the first end of the switching transistor T1. In the present embodiment, the current output from the switching transistor T1 flows to the detection capacitor C2 via the detection transistor T2 due to the turn-on of the detection transistor T2, such that the voltage of the first end of the switching transistor T1 gradually increases. The critical voltage (i.e., the voltage of the first end of the switching transistor T1 at this time) of the detection line Sense Line is detected and recorded through the detector when the detector detects that the current output from the first end of the switching transistor T1 changes from non-zero to zero. It should be noted that the detection transistor T2 needs to be kept in a turn-on state when the critical voltage of the detection line Sense Line is detected by the detector. The threshold voltage of the switching transistor T1 can be calculated according to Vth=Vg−Vsc. Vth is the threshold voltage of the switching transistor, Vg is the voltage of the control end of the switching transistor, and Vsc is the critical voltage detected by the detector. Vg may obtained by detecting a signal in the Switch Scan. In order to eliminate the influence of the residual voltage on the detected results, the initial voltage of the first end of the switching transistor T1 is set to zero. In other embodiments, it should be understood that there are more selectable manners of the detection circuit, which are all within the protection scope of the present disclosure.

Figure 7:
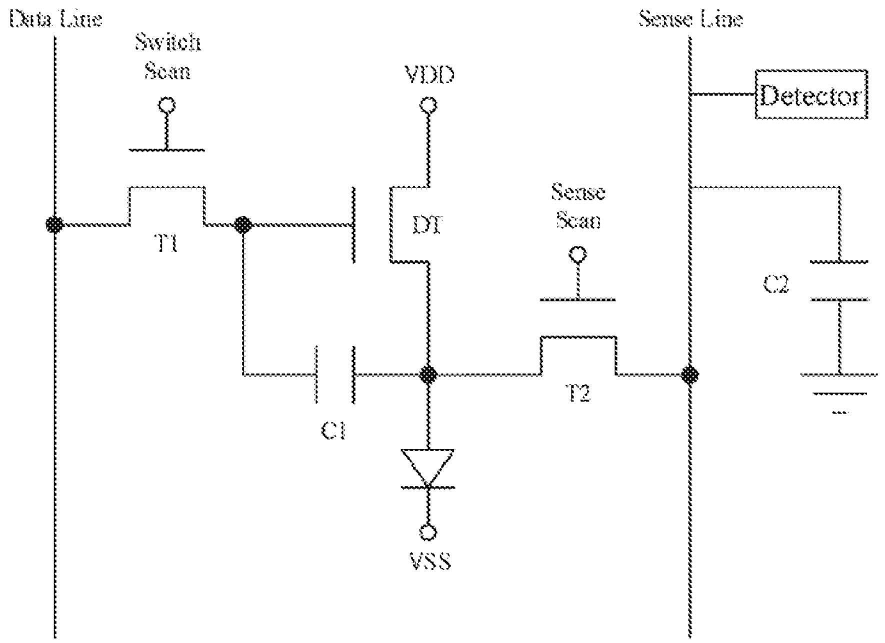
FIG. 7 is circuit diagram of a detection circuit according to another example embodiment of the present disclosure.

In the present embodiment, a processing parameter of the switching transistor T1 and the driving transistor DT in the non-display area are the same. It can also be understood that the processing parameter of the driving transistor DT of the pixel driving circuit in the non-display area is the same as the processing parameter of the switching transistor T1 of the pixel driving circuit in the display area. As a result, a width-length ratio is the same, thereby a characteristic of a thin film transistor for the switching transistor T1 and the driving transistor DT are the same. In the present example embodiment, the threshold of the switching transistor T1 can also be obtained indirectly by detecting a threshold of the driving transistor DT via the above described detection circuit. In the present embodiment, the threshold voltage of the driving transistor of the pixel driving circuit in the non-display area is detected to obtain the threshold voltage of the switching transistor of the pixel driving circuit in the display area, as an example. A circuit diagram of the detection circuit for a further example embodiment of the present disclosure is shown in FIG. 7. The detection circuit may include a detector, a detection line Sense Line, a detection transistor T2, and a detection capacitor C2. The detection line Sense Line is coupled with the detector, and the detector may be configured to detect a voltage and a current of the detection line Sense Line. A first end of the detection transistor T2 is coupled with the second end of the driving transistor DT. A second end of the detection transistor T2 is coupled with the detection line Sense Line. A control end of the detection transistor T2 is configured to receive a control signal Sense Scan to control an on-off state of the first end and the second end of the detection transistor T2. A first electrode of the detection capacitor C2 is coupled with the detection line Sense Line, and a second electrode of the detection capacitor C2 is grounded. In the present example embodiment, the detection circuit 11 can detect the threshold voltage of the switching transistor T1 during the charging stage of the pixel driving circuit. In the charging stage of the pixel circuit, a high potential signal Vs is input to the second end of the switching transistor T1 via the data line Data Line, and the control end of the switching transistor T1 is turned on under a control of the scan signal Switch Scan. The control signal Sense Scan is applied on the control end of the detection transistor T2 to turn on the detection transistor T2. The detection line Sense Line sets an initial voltage of the first end of the switching transistor T1 to zero through the detection transistor T2. A high potential signal is input to the second end of the switching transistor T1 via the data line Data Line when the switching transistor T1 is the N-type transistor. When a voltage Vdata input from the data line Data Line keeps rising, so that a voltage of the control end of the driving transistor DT is larger than a threshold voltage Vth of the driving transistor DT, the second end of the driving transistor DT is made to output a current, that is, the detector detects the current output from the second end of the driving transistor DT changing from zero to non-zero through the detection line Sense Line. At this time, Vdata=Vth+Vsense, where Vsense is the voltage of the second end of the driving transistor DT, that is, a voltage of the detection line Sense Line detected by the detector. Therefore, the voltage of the second end of the driving transistor DT is recorded when the detector detects a current output from the second end of the driving transistor DT via the detection line Sense Line. At this time, Vth=Vdata−Vsense.

Figure 8:
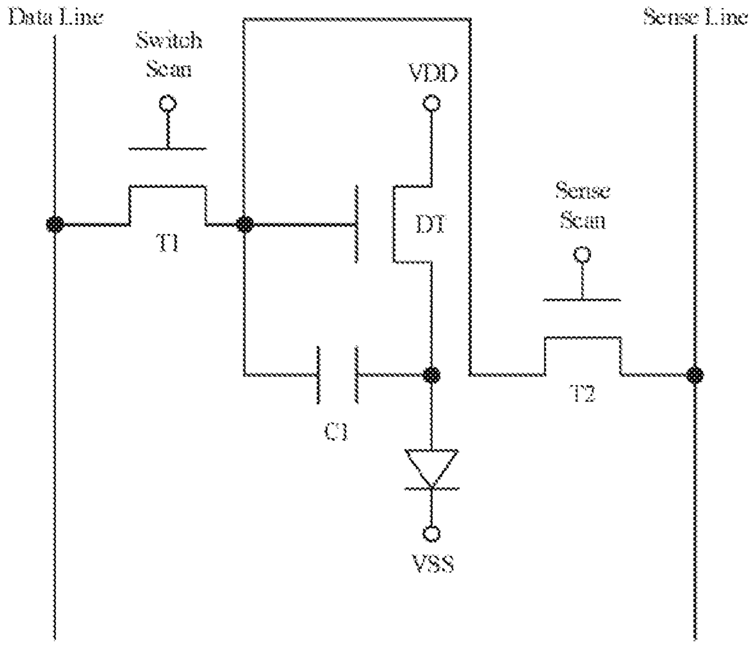
FIG. 8 is circuit diagram of a detection circuit according to still another example embodiment of the present disclosure.

In the present example embodiment, a circuit diagram of the detection circuit for a further example embodiment of the present disclosure is shown in FIG. 8. The charging capacitor C1 of the pixel driving circuit can be used as the detection capacitor. A cost can be saved and a structure can be simplified because the detection capacitor and the charging capacitor are the same one, and a charging capacity of a data signal of the pixel driving circuit during the charging stage can be reduced, thereby improving the charging speed of the data signal.

In the present example embodiment, the provided scan signal adjusting device can adjust the scan signal according to the above provided scan signal adjusting method. The scan signal adjusting device has the same technical features as the scan signal adjusting method, and will not be repeated here.

In the present example embodiment, a display panel is further provided, and the display panel includes the above described scan signal adjusting device and the pixel driving circuit. The display panel may include a display area and a non-display area. The pixel driving circuit may be arranged in the display area and the non-display area. The above-described scan signal adjusting device may be arranged in both the non-display area and the display area.

It should be noted that the display area refers to an area used for normal display, and the non-display area is usually located around the display area. The non-display area is configured to set components including a virtual pixel, an integrated circuit, a gate driving circuit, a scanning wire lead, a data wire lead, etc. The above described scan signal adjusting device can be arranged in the non-display area around the display panel to detect a virtual pixel driving circuit of the display panel. In the present embodiment, a process parameter of the switching transistor of the pixel driving circuit in the display area of the display panel are basically the same as a process parameter of the driving transistor of the pixel driving circuit in the non-display area, such that the switching transistor and the driving transistor have the same transistor characteristic. Therefore, the threshold of the switching transistor on the whole display panel can be obtained by detecting the virtual pixel driving circuit. An arrangement of the driving transistor of the pixel driving circuit arranged in the non-display area are the same with the switching transistor of the pixel driving circuit arranged in the display area due to the pixel driving circuit in the non-display area may not display normally, which will not affect the normal display, and can further simplify the process. It should be understood that the above described scan signal adjusting device can also detect and control the pixel driving circuit in the display area, which are all within the protection scope of the present disclosure.

In the present example embodiment, an arrangement manner of the pixel driving circuit may include a switching transistor, a driving transistor, a charging capacitor, and an electroluminescent element. A second end of the switching transistor is coupled with a data line to receive a data signal. A first end of the switching transistor is coupled with a control end of the driving transistor. A control end of the switching transistor is coupled a scan signal to control an on-off state of the first end and the second end of the switching transistor. A first end of the driving transistor is coupled with a first power signal terminal. A second end of the driving transistor is coupled with an input end of the electroluminescent element. An output end of the electroluminescent element is coupled with a second power signal terminal. A first electrode of the charging capacitor is coupled with the first end of the switching transistor, and a second electrode of the charging capacitor is coupled with the input end of the driving transistor.

The scan signal adjusting device includes a detection circuit and a control circuit. The detection circuit includes a detector, a detection line, a detection transistor, and a detection capacitor. The detection line is coupled with the detector. The detector detects a voltage of the detection line. A first end of the detection transistor is coupled with a first end of the switching transistor of the pixel driving circuit in the display area. A second end of the detection transistor is coupled with the detection line. A control end of the detection transistor is configured to receive a control signal to control an on-off state of the first end and the second end of the detection transistor. A first electrode of the detection capacitor is coupled with the detection line, and a second electrode of the detection capacitor is grounded.

In the present embodiment, a transistor characteristic of the driving transistor of the pixel driving circuit in the non-display area is the same as a transistor characteristic of the switching transistor of the pixel driving circuit in the display area. In the present example embodiment, an arrangement of a scan signal adjusting device may further include a control circuit and a detection circuit. The detection circuit includes a detection line, a detector, a detection transistor, and a detection capacitor. The detector is coupled with the detection line, and the detector is configured to detect a voltage of the detection line. A first end of the detection transistor is coupled with a second end of the driving transistor of the pixel driving circuit in the non-display area. A second end of the detection transistor is coupled with the detection line. A control end of the detection transistor is configured to receive a control signal to control an on-off state of the first end and the second end of the detection transistor. A first electrode of the detection capacitor is coupled with the detection line, and a second electrode of the detection capacitor is grounded.

After considering the specification and practicing the disclosure herein, it will be apparent for those skilled in the art to think of other embodiments of the present disclosure. The present application intends to cover any variants, usage, or adaptable changes of the present disclosure. These variants, usage, or adaptable changes follow the general principles of the present disclosure, and include common sense or common technical means in the art not disclosed by the present disclosure. The specification and embodiments are only examples, and the real scope and spirit of the present disclosure are defined by the appended claims.

The features, structures or a characteristics described above may be combined in one or more embodiments in any suitable manner. A feature discussed in each embodiment is interchangeable, if possible. Many details are provided in the above description to give a thorough understanding of the embodiment of the present disclosure. However, those skilled in the art will realize that a technical solution of the present disclosure can be practiced without one or more special details, and another method, component, material, etc. may also be adopted. In the other cases, a common structure, material, or operation are not shown or described in detail to avoid obscuring various aspects of the present disclosure.

What is claimed is:

1. A scan signal adjusting device for adjusting a scan signal of a control end of a switching transistor in a pixel driving circuit, the scan signal adjusting device comprising:
- a detection circuit configured to obtain a threshold voltage of the switching transistor; and
- a control circuit configured to adjust a voltage of the scan signal during a turn-off period according to the threshold voltage of the switching transistor.

2. The scan signal adjusting device according to claim 1, wherein the control circuit comprises a chip on a display panel or a variable resistor on a circuit board of the display panel.

3. The scan signal adjusting device according to claim 1, wherein the pixel driving circuit is arranged in a display area of a display panel; and the detection circuit comprises:
- a detection line;
- a detector coupled to the detection line, the detector being configured to detect a voltage and a current of the detection line; and
- a detection transistor, a first end of the detection transistor being coupled to a first end of the switching transistor of the pixel driving circuit in the display area, a second end of the detection transistor being coupled with the detection line, and a control end of the detection transistor being configured to receive a control signal to control an on-off state of the first end and the second end of the detection transistor.

4. The scan signal adjusting device according to claim 3, wherein the detection circuit further comprises:
- a detection capacitor, a first electrode of the detection capacitor being coupled with the detection line, and a second electrode of the detection capacitor being grounded.

5. The scan signal adjusting device according to claim 1, wherein the pixel driving circuit is arranged in a display area and a non-display area of a display panel, the pixel driving circuit further comprises a driving transistor; and a transistor characteristic of the driving transistor of the pixel driving circuit in the non-display area is the same as a transistor characteristic of the switching transistor of the pixel driving circuit in the display area.

6. The scan signal adjusting device according to claim 5, wherein the detection circuit comprises:
- a detection line;
- a detector, coupled with the detection line, configured to detect a voltage and a current of the detection line;
- a detection transistor, a first end of the detection transistor being coupled with a second end of the driving transistor of the pixel driving circuit in the non-display area, a second end of the detection transistor being coupled with the detection line, and a control end of the detection transistor being configured to receive a control signal to control an on-off state of the first end and the second end of the detection transistor; and
- a detection capacitor, a first electrode of the detection capacitor being coupled with the detection line, and a second electrode of the detection capacitor being grounded.

7. The scan signal adjusting device according to claim 1, wherein the pixel driving circuit comprises:
- a switching transistor, a second end of the switching transistor being coupled with a data line to receive a data signal, a control end of the switching transistor being coupled with the scan signal to control an on-off state of a first end and the second end of the switching transistor;
- a driving transistor, a control end of the driving transistor being coupled with the first end of the switching transistor, a first end of the driving transistor being coupled with a first power signal terminal;

an electroluminescent element, an input end of the electroluminescent element being coupled with a second end of the driving transistor, an output end of the electroluminescent element being coupled with a second power signal terminal; and a charging capacitor, a first electrode of the charging capacitor being coupled with the first end of the switching transistor, a second electrode of the charging capacitor being coupled with the input end of the electroluminescent element.

8. A display panel, comprising a pixel driving circuit and the scan signal adjusting device of claim 7.

9. A scan signal adjusting method for adjusting a scan signal of a control end of a switching transistor in a pixel driving circuit, comprising:

obtaining a threshold voltage of the switching transistor;

adjusting a voltage of the scan signal during a turn-off period according to the threshold voltage of the switching transistor.

10. The scan signal adjusting method according to claim 9, wherein the obtaining a threshold voltage of the switching transistor is completed in a charging phase of the pixel driving circuit.

11. The scan signal adjusting method according to claim 9, wherein the obtaining a threshold voltage of the switching transistor comprises:

applying a control voltage to a control end of the switching transistor to turn on the switching transistor;

inputting a constant voltage to a second end of the switching transistor such that an current being output from a first end of the switching transistor;

detecting a critical voltage of the first end of the switching transistor when the current output from the switching transistor changes from non-zero to zero or changes from zero to non-zero; and obtaining the threshold voltage of the driving transistor according to the control voltage and the critical voltage.

12. The scan signal adjusting method according to claim 11, wherein the obtaining a threshold voltage of the switching transistor is completed in a charging phase of the pixel driving circuit.

13. The scan signal adjusting method according to claim 11, wherein an initial voltage of the first end of the switching transistor is set to zero while applying the control voltage to the control end of the switching transistor.

14. The scan signal adjusting method according to claim 13, wherein the obtaining a threshold voltage of the switching transistor is completed in a charging phase of the pixel driving circuit.

15. The scan signal adjusting method according to claim 9, wherein the adjusting a voltage of the scan signal during a turn-off period according to the threshold voltage of the switching transistor comprises:

adjusting the voltage of the scan signal during the turn-off period when an absolute value of a difference between the threshold voltage of the switching transistor and the voltage of the scan signal during the turn-off period is less than a preset value.

16. The scan signal adjusting method according to claim 15, wherein the obtaining the threshold voltage of the switching transistor comprises:

obtaining the threshold voltage of the switching transistor once per each preset frame number of the pixel driving circuit.

17. The scan signal adjusting method according to claim 15, further comprising:

not adjusting the voltage of the scan signal during a turn-off period any more when an absolute value of the voltage of the scan signal during the turn-off period is larger than the set value.

18. The scan signal adjusting method according to claim 15, wherein the adjusting a voltage of the scan signal during a turn-off period comprises:

adjusting the voltage of the scan signal during the turn-off period in a black frame insertion stage of the pixel driving circuit according to the threshold voltage of the switching transistor and a type of the switching transistor;

wherein the pixel driving circuit is in a non-charging period when the scan signal is in the turn-off period, and the non-charging period of the pixel driving circuit comprises the black frame insertion period of the pixel driving circuit.

19. The scan signal adjusting method according to claim 18, wherein the adjusting a voltage of the scan signal during a turn-off period in a black frame insertion stage of the pixel driving circuit according to the threshold voltage of the switching transistor and a type of the switching transistor comprises:

controlling the voltage of the scan signal during the turn-off period to a first preset voltage so that the difference between the threshold voltage of the switching transistor and the first preset voltage is larger than the preset value when the switching transistor is an N-type transistor.

20. The scan signal adjusting method according to claim 18, wherein the adjusting a voltage of the scan signal during a turn-off period in a black frame insertion stage of the pixel driving circuit according to the threshold voltage of the switching transistor and a type of the switching transistor comprises:

controlling the voltage of the scan signal during the turn-off period to a second preset voltage so that the absolute value of the difference between the threshold voltage of the switching transistor and the second preset voltage is larger than the preset value when the switching transistor is a P-type transistor.

* * * * *